(12) United States Patent
Chae (10) Patent No.: US 9,180,905 B2
(45) Date of Patent: *Nov. 10, 2015

(54) ELECTRIC POWER STEERING APPARATUS FOR VEHICLE

(71) Applicant: MANDO CORPORATION, Pyeongtaek-si, Gyeonggi-do (KR)

(72) Inventor: Han Sang Chae, Seongnam-si (KR)

(73) Assignee: MANDO CORPORATION, Pyeongtaek-Si, Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/288,093

(22) Filed: May 27, 2014

(65) Prior Publication Data

US 2014/0353065 A1    Dec. 4, 2014

(30) Foreign Application Priority Data

May 30, 2013 (KR) .......................... 10-2013-0061799

(51) Int. Cl.
*B62D 5/04* (2006.01)
*F16H 1/28* (2006.01)

(52) U.S. Cl.
CPC ............ *B62D 5/0403* (2013.01); *B62D 5/0415* (2013.01); *B62D 5/0421* (2013.01); *F16H 2001/2872* (2013.01)

(58) Field of Classification Search
CPC ... B62D 5/0421; B62D 5/0403; B62D 5/0415
See application file for complete search history.

(56) References Cited

U.S. PATENT DOCUMENTS

| 6,039,143 | A  | * | 3/2000  | Kielar   | B62D 5/0421 180/253 |
| 2007/0295552 | A1 | * | 12/2007 | Watanabe | B62D 5/0403 180/444 |
| 2011/0147111 | A1 | * | 6/2011  | Sun      | B62D 5/0406 180/444 |
| 2014/0305731 | A1 | * | 10/2014 | Ko       | B62D 5/0403 180/444 |
| 2014/0353069 | A1 | * | 12/2014 | Chae     | B62D 5/0415 180/444 |

FOREIGN PATENT DOCUMENTS

| JP | 11105719 A   | 4/1999 |
| JP | 2004001626 A | 1/2004 |

OTHER PUBLICATIONS

Korean Office Action for application No. 10-2013-0061799 dated Jun. 26, 2014.

* cited by examiner

*Primary Examiner* — Kevin Hurley
*Assistant Examiner* — Gabriela C Craciun
(74) *Attorney, Agent, or Firm* — Hauptman Ham, LLP (57) ABSTRACT

Disclosed is an electric power steering apparatus for a vehicle. The electric power steering apparatus for the vehicle has a structure in which a motor shaft, an input shaft, a pinion shaft, and the like are coaxially disposed to improve a structure of a conventional art in which an electric motor is essentially exposed, so as to prevent interference with other structures, thereby forming a layout of the steering apparatus to be compact.

5 Claims, 6 Drawing Sheets

FIG. 6

ELECTRIC POWER STEERING APPARATUS FOR VEHICLE

CROSS-REFERENCE TO RELATED APPLICATION

This application claims the priority under 35 U.S.C. §119 (a) to Korean Application Serial No. 10-2013-0061799, which was filed in the Korean Intellectual Property Office on May 30, 2013, the entire content of which is hereby incorporated by reference.

BACKGROUND OF THE INVENTION

1. Field of the Invention

The present invention relates to an electric power steering apparatus for a vehicle, and more particularly to an electric power steering apparatus for a vehicle, which has a structure in that a motor shaft, an input shaft, a pinion shaft, and the like, are coaxially disposed to improve a structure of a conventional electric power steering in which an electric motor is essentially exposed, so as to prevent interference with the other structures, thereby forming a layout of the electric power steering apparatus to be compact, and in which, although a first ring gear and a second ring gear have different number of gear teeth, identical planetary gears are tooth-engaged with the first and second ring gears, thereby improving convenience for assembling of the planetary gear assembly and obtaining a large gear reduction ratio.

2. Description of the Related Art

Figure 1:
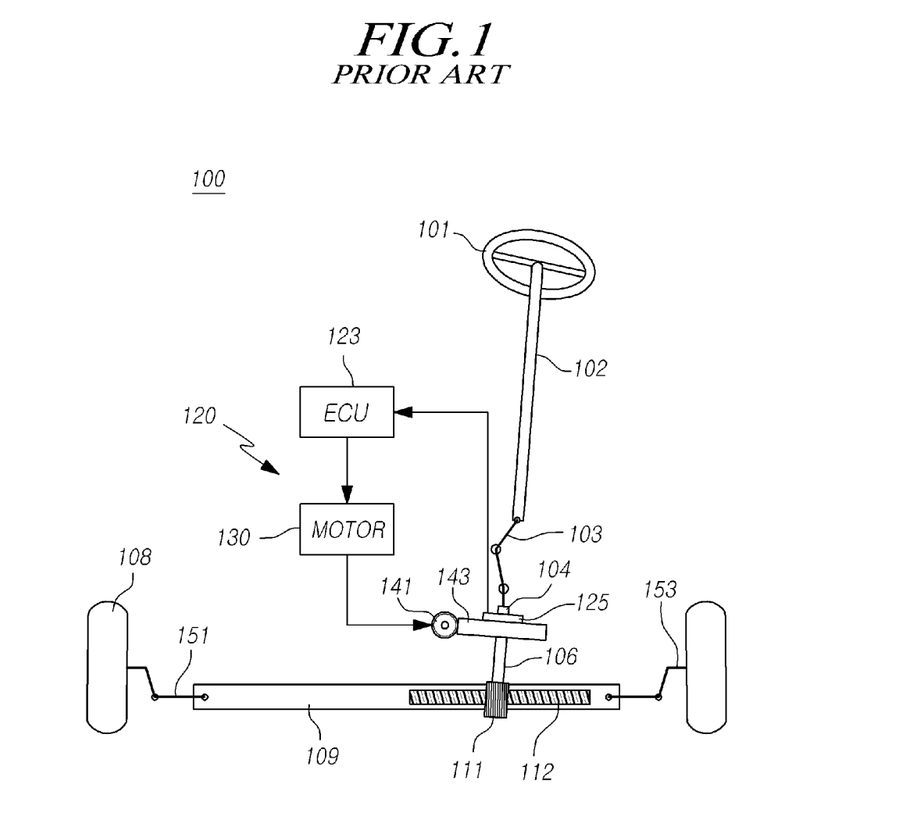
FIG. 1 is a view illustrating a structure of a conventional electric power steering apparatus.

FIG. 1 is a view illustrating a structure of a conventional electric power steering apparatus.

As shown in FIG. 1, the conventional electric power steering apparatus 100 for the vehicle includes a steering system extending from a steering wheel 101 to both wheels 108, and an auxiliary power mechanism 120 for supplying an auxiliary steering force to the steering system.

The steering system includes a steering shaft 102, which has one end thereof connected to the steering wheel 101 and the other end thereof connected to a driving shaft by means of a universal joint 103.

The driving shaft includes an input shaft 104 connected to the steering shaft 102, and a pinion shaft 106 connected to the input shaft 104 by means of a torsion bar (not shown), and having a pinion gear 111 mounted on a lower end thereof.

The pinion gear 111 mounted on the pinion shaft 106 is tooth-engaged with a rack gear 112 formed on an outer peripheral surface of a rack bar 109, and the rack bar 109 has both ends connected to wheels 108 of the vehicle through tie rods 151 and knuckle arms 153, respectively.

The auxiliary power mechanism 120 includes a torque sensor 125 for detecting a torque generated at the input shaft 104 as a driver rotates the steering wheel 101 and outputting an electric signal proportional to the detected torque, an electric control unit (ECU) 123 for generating a control signal based on an electric signal transmitted from the torque sensor 125, an electric motor 130 for generating an auxiliary power based on a control signal transferred from the electric control unit 123, and worm 141 and worm wheel 143 for transferring an auxiliary power from the electric motor 130 to the pinion shaft 106.

However, in the conventional electric power steering apparatus for the vehicle, the electric motor, the worm, the worm wheel, and the like, are used to construct a reducer of the auxiliary power mechanism. In this structure, the electric motor is essentially exposed when they are mounted on the vehicle, and causes interference with other structures. Accordingly, there is a disadvantageous in the layout.

SUMMARY OF THE INVENTION

The present invention has been developed to solve the above-mentioned problems in the conventional art, and an aspect of the present invention is to provide an electric power steering apparatus for a vehicle, which has a structure in which a motor shaft, an input shaft, a pinion shaft, and the like, are coaxially disposed in order to improve a structure of a conventional art in which an electric motor is essentially exposed, so as to prevent interference with other structures, thereby forming a layout of the steering apparatus to be compact.

Another aspect of the present invention is to provide an electric power steering apparatus for a vehicle, in which although first and second ring gears have different number of gear teeth, identical planetary gears are tooth-engaged with the first and second ring gears, thereby improving convenience for assembling of a planetary gear assembly, and obtaining a large gear reduction ratio.

The aspects of the present invention are not limited thereto, and other aspects of the present invention will be apparently understood by those skilled in the art through the below description.

In accordance with an aspect of the present invention, an electric power steering apparatus is provided. The electric power steering apparatus includes: an electric motor supported on an inner peripheral surface of a housing, having a hollow shape, and including a motor shaft on which a sun gear is mounted on an outer peripheral surface of one end thereof; a planetary gear assembly which includes a first ring gear fitted in and fixed to the housing at a side of the motor, a second ring gear provided at a side of the first ring gear opposite to the motor, a plurality of planetary gears, which are externally engaged with the sun gear while being internally engaged with the first and second ring gears respectively, and a carrier which both ends of a central shaft of the planetary gear is coupled to and supported on; and a pinion shaft extending through the motor shaft, and having one end thereof on an outer peripheral surface of which a pinion gear is mounted to be engaged with a rack gear formed on a rack bar and the other end thereof which is connected to the input shaft by means of the torsion bar, the pinion shaft being connected to the second ring gear.

According to the embodiment of the present invention, the electric power steering apparatus for a vehicle has a structure in that a motor shaft, an input shaft, a pinion shaft, and the like, are coaxially disposed to improve a structure of a conventional art in which an electric motor is essentially exposed so as to prevent interference with other structures, thereby forming a layout structure of the steering apparatus to be compact.

Further, according to the embodiment of the present invention, there is an advantage in which, although first and second ring gears have different number of gear teeth, identical planetary gears are tooth-engaged with the first and second ring gears, thereby improving convenience for assembling of a planetary gear assembly and obtaining a large gear reduction ratio.

BRIEF DESCRIPTION OF DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the exemplary drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
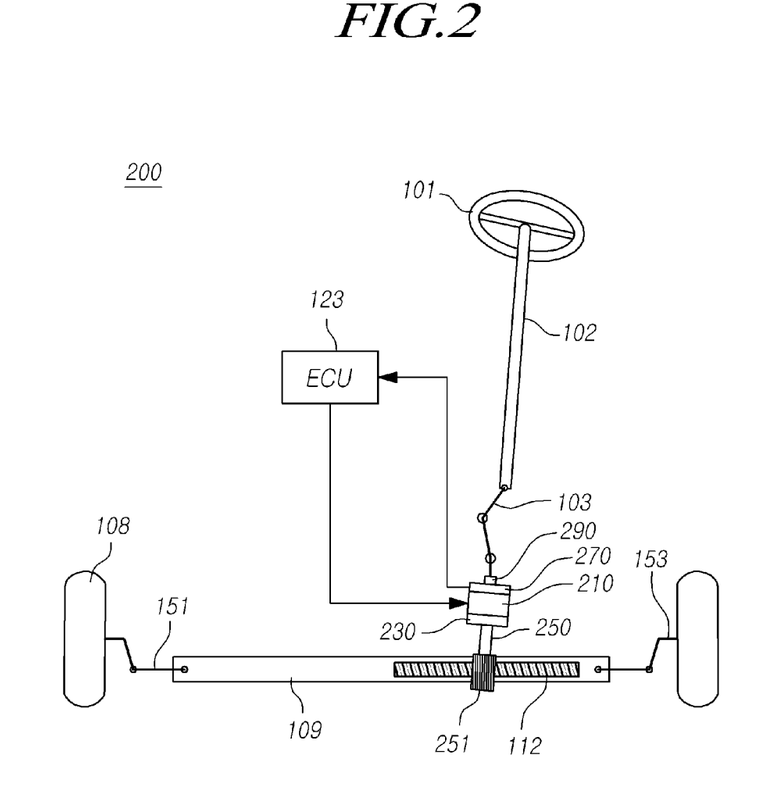
FIG. 2 is a view illustrating a structure of an electric power steering apparatus for a vehicle according to an embodiment of the present invention.
Figure 3:
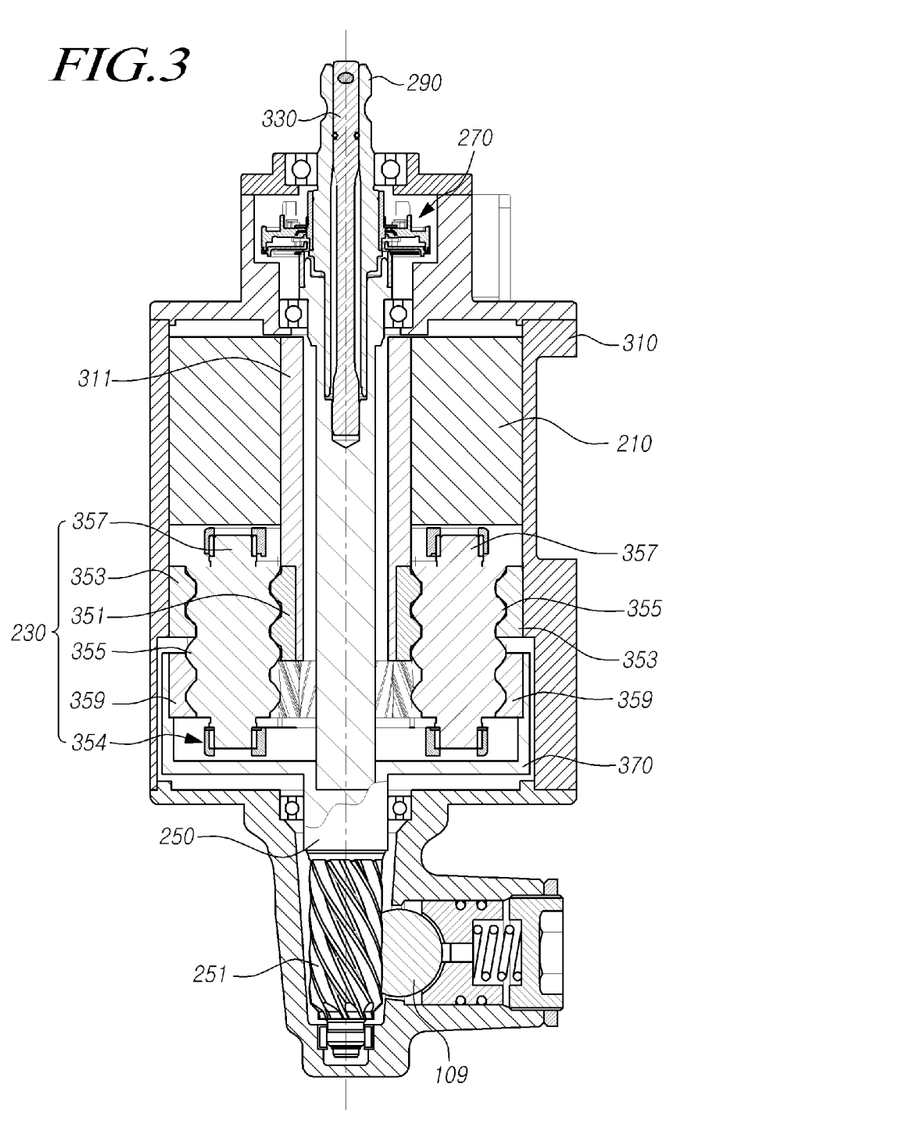
FIG. 3 is a sectional view partially illustrating the electric power steering apparatus of FIG. 2.
Figure 4:
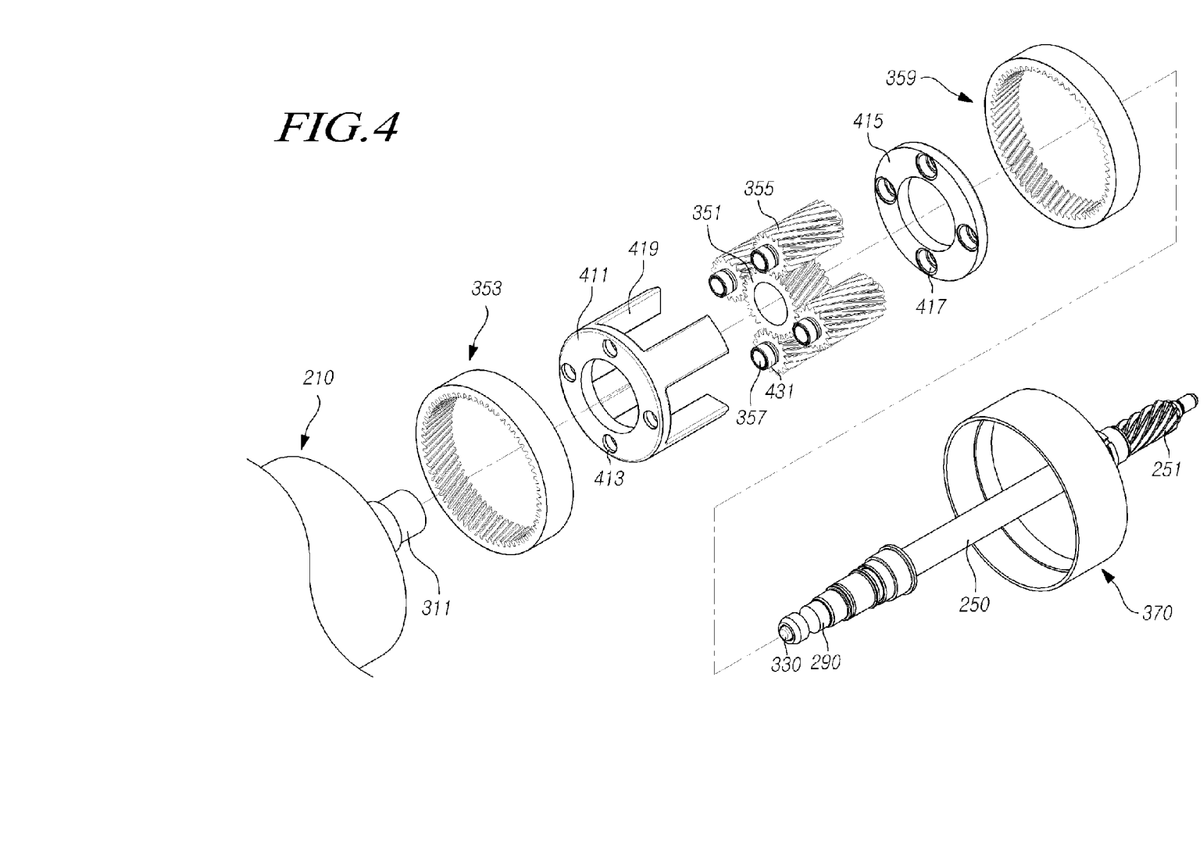
FIG. 4 is an exploded perspective view partially illustrating the electric power steering apparatus of FIG. 3.
Figure 5:
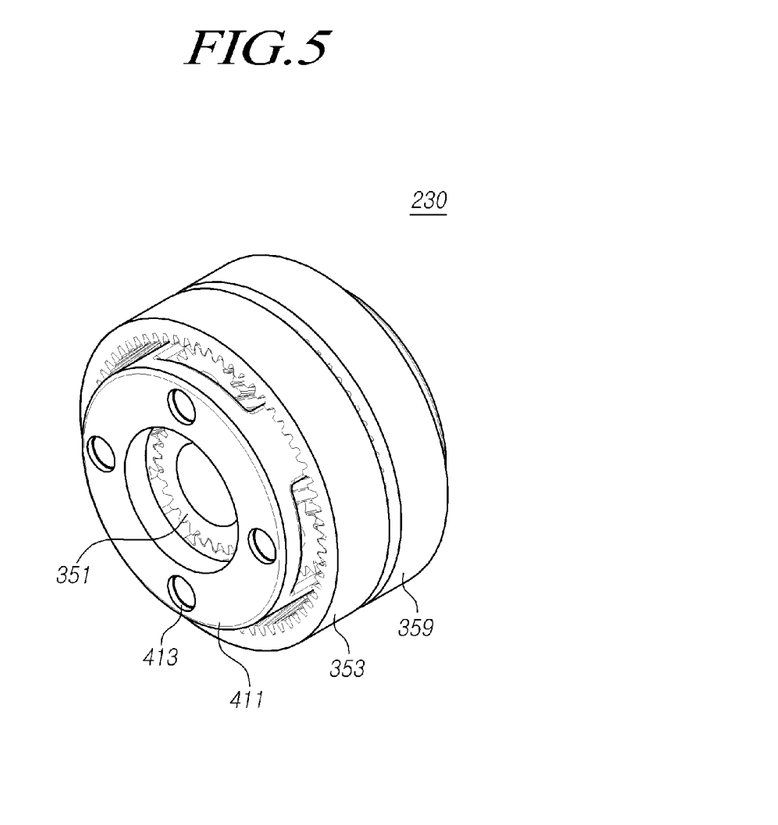
FIG. 5 is a perspective view illustrating a planetary gear assembly of FIG. 3.
Figure 6:
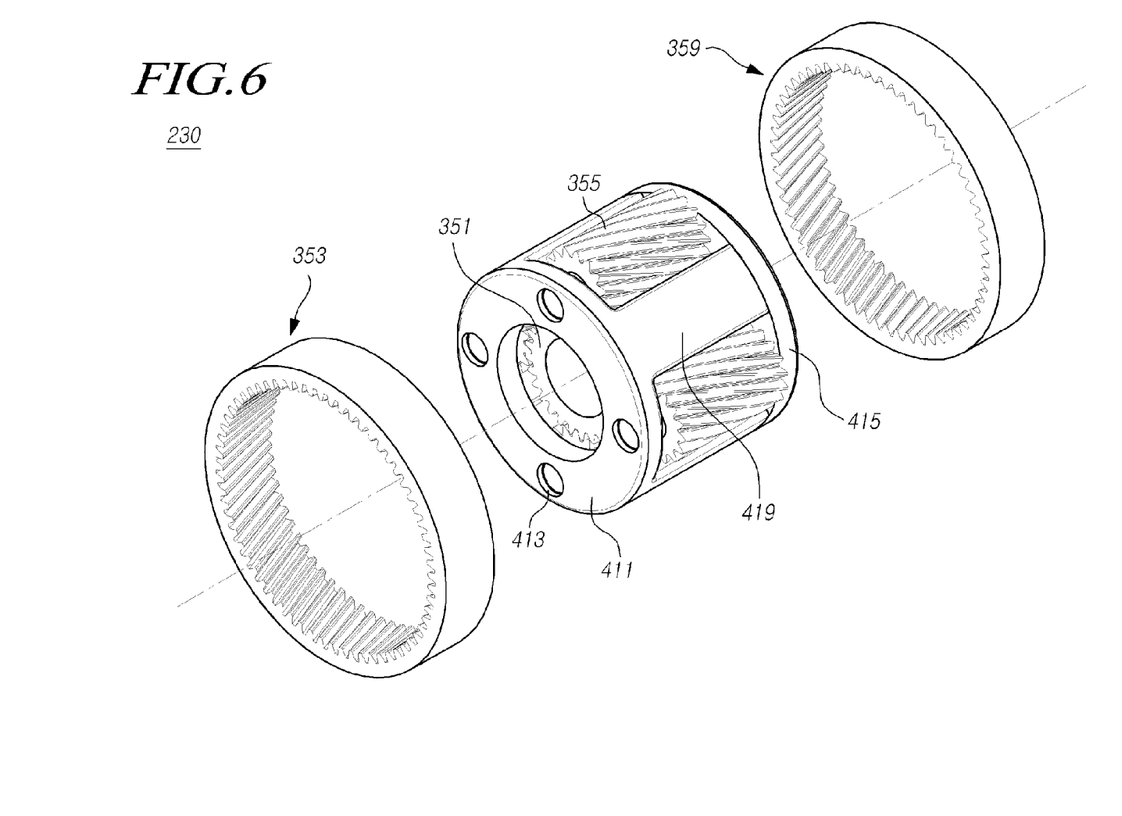
FIG. 6 is an exploded perspective view illustrating the planetary gear assembly of FIG. 5.

FIG. 2 is a view illustrating a structure of an electric power steering apparatus for a vehicle according to an embodiment of the present invention. FIG. 3 is a sectional view partially illustrating the electric power steering apparatus of FIG. 2. FIG. 4 is an exploded perspective view partially illustrating the electric power steering apparatus of FIG. 3. FIG. 5 is a perspective view illustrating a planetary gear assembly of FIG. 3. FIG. 6 is an exploded perspective view illustrating the planetary gear assembly of FIG. 5.

As shown in the drawings, the electric power steering apparatus 200 for the vehicle according to the embodiment of the present invention includes: an electric motor 210 supported on an inner peripheral surface of a housing 310 and having a hollow motor shaft 311, on an outer peripheral surface of one end of which a sun gear 351 is mounted; a planetary gear assembly which has a first ring gear 353 fitted in the housing 310 at one side of the electric motor 210, a second ring gear 359 provided at one side of the first ring gear 353 which is distal from the electric motor 210, a plurality of planetary gears 355 which is externally engaged with the sun gear 351 and internally engaged with the first ring gear 353 and the second ring gear 359, and a carrier 354 which is coupled to and support both ends of a central shaft 357 of the planetary gears 355; and, a pinion shaft 250 which extends through the motor shaft 311, and has one end thereof on which a pinion gear 251 is mounted and engaged with a rack gear 112 formed on a rack bar 109 and the other end thereof which is connected to the input shaft 290 by means of a torsion bar 330, the pinion shaft being connected to the second ring gear 359.

The input shaft 290 is connected to a steering shaft 102 by means of a universal joint 103, and the steering shaft 102 is connected to a steering wheel 101. Thus, the steering shaft 102 and the input shaft 290 are associated with each other and rotate together as the steering wheel 101 rotates.

The electric motor 210 is supported on an inner peripheral surface of the housing 310, which has the motor shaft with a hollow shape and the sun gear 351 integrally mounted on an outer peripheral surface of one end of the motor shaft 311.

On the other hand, the electric motor 210 generates an auxiliary power based on a control signal transferred from an electric control unit (ECU) 123, which rotates the sun gear 351 through the motor shaft 311 by using the auxiliary power, resulting in a rotation of the pinion shaft 250 described later.

Further, the motor 210 is provided with a torque sensor 270 which is coupled to the input shaft 290 and the pinion shaft 250 described later at an upper portion, i.e., a side opposite to the sun gear 351, of the electric motor 210, and measures a value of torque applied to the input shaft 290 as the steering wheel 101 is operated, and the torque value of the input shaft 290 measured by the torque sensor 270 is converted into an electric signal and transferred to the ECU 123, so as to control the electric motor 210.

The planetary gear assembly 230 includes the first ring gear 353, the second ring gear 359, a plurality of planetary gears 355, and a carrier 354.

The first ring gear 353 is fitted in and fixed to the housing at one side of the electric motor 210.

The second ring gear 359 is provided on a side of the first ring gear at a distal position from the motor 210, and is connected to the pinion shaft 250 by means of a connection body 370 described later.

On the other hand, the first and second ring gears 353 and 359 are configured to have the different number of gear teeth. That is, the first and second ring gears 353 and 359 may be configured so that the second ring gear 359 has the number of gear teeth larger than that of gear teeth of the first ring gear 353.

A plurality of planetary gears 355 is provided, which is externally engaged with the sun gear 351 while being internally engaged with the first and second ring gears 353 and 359, respectively.

As described above, since the first ring gear 353 is fitted in and fixed to the housing 310, when the sun gear 351 is rotated by the auxiliary power provided by the electric motor 210, the planetary gear 355 externally engaged with the sun gear 351 rotates and revolves around the sun gear 351 between the sun gear 351 and the first ring gear 353. In this event, when the planetary gear 355 revolves around the sun gear 351 along the first ring gear 353 by one time, the second ring gear 359 rotates in proportion to a difference from the number of gear teeth of the first ring gear 353.

Accordingly, the pinion shaft 250, which is connected to the second ring gear 359 by means of the connection body 370 as the second ring gear 359 rotates and is described later, is rotated by the auxiliary power provided from the electric motor 210.

Here, the second ring gear 359 is integrally fitted in the connection body 370 having a hollow cylindrical shape, so that a rotation force of the second ring gear 359 is transferred to the pinion shaft 250 through the connection body 370.

Both ends of the central shaft 357 of the planetary gear 355 are coupled to and supported by the carrier 354. The structure of the carrier 354 will be described in detail. The carrier 354 includes: a first supporting portion 411 having an annular shape and a first hole 413 in which one end of the central shaft 357 is inserted; a second supporting portion 415 having an annular shape and a second hole 417, which is opposite to the first hole 413 and in which the other end of the central shaft 357 is inserted; and a connection portion 419 which connects the first supporting portion 411 with the second supporting portion 415 and supports the first supporting portion 411 and the second supporting portion 415.

The first supporting portion 411 may be made of an annular plate. Since the first hole 413 is formed in the supporting portion 411, one end of the central shaft 357 is inserted in and coupled to the first hole 413.

The second supporting portion 415 may be also made of an annular plate. Since the second hole 417 is formed in the second supporting portion 415, the other end of the central shaft 357 is inserted in and coupled to the second hole 415.

The connection portion 419 connects the first supporting portion 411 with the second supporting portion 415, which may be integrally formed on the supporting portion 411 or the second supporting portion 415.

That is, as the connection portion 419 is integrally formed on the first supporting portion 411, the connection portion 419 and the first supporting portion 411 may be formed to be one structure. In the drawings, an example of the one structure is shown.

Of course, alternatively, the connection portion 419 may be integrally formed on the second supporting portion 415 so that the second supporting portion 415 and the connection portion 419 construct one structure.

As described above, since the connection portion 419 is integrally formed on the first supporting portion 411 or the second supporting portion 415, a management of parts is convenient and the planetary gears 355 and the carrier 354 may be easily assembled and separated.

On the other hand, a first bearing 431 is mounted on an outer peripheral surface of one end of the central shaft 357 in such a manner that it is press-fitted in the first hole 413, while a second bearing 731 is mounted on an outer peripheral surface of the other one of the connection shaft 357 in such a manner that it is press-fitted in the second hole 417.

The pinion shaft 250 extends through the motor shaft 311, which has one end thereof on which a pinion gear 251 is formed to be engaged with the rack gear 112 formed on the rack bar 109, and the other end thereof which is connected to the input shaft 290 by means of the torsion bar 330.

Further, the pinion shaft 311 is connected to the second ring gear 359 through the connection body 370, and thus rotates along with the second ring gear 359 as described above.

On the other hand, the first ring gear 353 has a different number of gear teeth from those of the second ring gear 359, and one of the first and second ring gears 353 and 359 has a positive electric potential while the other has a negative electric potential. In the embodiment of the present invention, the first ring gear 353 has the positive potential and the second ring gear 359 has the negative potential.

Herein, the positive potential refers to gear teeth, which have large addendum circles and dedendum circles as compared with standard gear teeth, and the negative potential refers to gear teeth which have small addendums circle and dedendum circles as compared with standard gear teeth.

As described above, as the first ring gear 353 has the positive electric potential and the second ring gear 359 has the negative electric potential, the identical planetary gear 355 may be tooth-engaged with the first and second ring gears 353 and 359, although the first ring gear 353 and the second ring gear 359 have the different number of gear teeth. Accordingly, it is possible to improve convenience for an assembly of the planetary gear assembly. Further, since the number of gear teeth of the first and second ring gears 353 and 359 can be relatively and freely adjusted, it is possible to obtain a large gear reduction ratio.

Hereinafter, an operation of the electric power steering apparatus for the vehicle according to the embodiment of the present invention will be described with reference to the drawings.

When the driver rotates the steering wheel 101, the steering shaft 102 and the input shaft 290 connected to the steering shaft 102 by means of the universal joint 103 rotate. In turn, the pinion shaft 250 connected to the input shaft 290 by means of the torsion bar 330 rotates, so that the rotation force of the steering wheel 101 is transferred as a driving force to enable the rack bar 109 to straightly move left and right.

The torque value of the input shaft 290 is measured by the torque sensor 270, and the measured torque value is converted into an electric signal, and then transmitted to the ECU 123.

On the other hand, the ECU 123 controls the electric motor 210 to generate the auxiliary power, based on an electric signal transmitted from the torque sensor 270 and electric signals transmitted from various sensors, and the generated auxiliary power rotates the motor shaft 311, resulting in the rotation of the sun gear 351.

Then, when the sun gear 351 rotates, the planetary gears 355 interposed between the sun gear 351 and the first ring gear 353 rotate and revolve, and simultaneously the second ring gear 359 engaged with the planetary gears 355 rotates to enable the pinion shaft 250 connected to the second ring gear 359 by means of the connection body 370 to rotate. As a result, the auxiliary power of the electric motor 210 is transferred to the pinion shaft 250, so as to assist the steering force of the driver.

As described above, according to the embodiment of the present invention, an electric power steering apparatus for a vehicle has a structure in that a motor shaft, an input shaft, a pinion shaft, and the like, are coaxially disposed to improve a structure of a conventional art in which an electric motor is essentially exposed, so as to prevent interference with other structures, thereby forming a layout structure of the steering apparatus to be compact.

Further, according to the embodiment of the present invention, there is an advantage in that although first and second ring gears have a different number of gear teeth, identical planetary gears are tooth-engaged with the first and second ring gears, so as to improve convenience for assembling of a planetary gear assembly, and obtaining a large gear reduction ratio.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

| Description of Reference Numerals | |
| --- | --- |
| 109: rack bar | 112: rack gear |
| 210: electric motor | |
| 230: planetary gear assembly | |
| 250: pinion shaft | 251: pinion gear |

-continued

Description of Reference Numerals

| | |
|---|---|
| 290: input shaft | 310: housing |
| 311: motor shaft | 330: torsion bar |
| 351: son gear | 353: first ring gear |
| 354: carrier | 355: planetary gear |
| 359: second ring gear | |

What is claimed is:

1. An electric power steering apparatus for a vehicle, comprising:
    an electric motor supported on an inner peripheral surface of a housing, having a hollow shape, and including a motor shaft on which a sun gear is mounted on an outer peripheral surface of one end thereof;
    a planetary gear assembly which includes a first ring gear fitted in and fixed to the housing at a side of the motor, a second ring gear provided at a side of the first ring gear opposite to the motor, a plurality of planetary gears which are externally engaged with the sun gear while being internally engaged with the first and second ring gears respectively, and a carrier which both ends of a central shaft of the planetary gear is coupled to and supported on; and
    a pinion shaft extending through the motor shaft, and having one end thereof on an outer peripheral surface of which a pinion gear is mounted to be engaged with a rack gear formed on a rack bar, and the other end thereof which is connected to the input shaft by means of the torsion bar, the pinion shaft being connected to the second ring gear.

2. The electric power steering apparatus as claimed in claim 1, further comprising a torque sensor mounted on an upper portion of the electric motor and connected to the input shaft and the pinion shaft, so as to measure a value of torque applied to the input shaft as the steering wheel is operated.

3. The electric power steering apparatus as claimed in claim 2, wherein the carrier comprises:
    a first supporting portion having an annular shape and a first hole in which one end of the central shaft of the planetary gear is inserted and coupled;
    a second supporting portion having an annular shape and a second hole which is formed to be opposite to the first hole and in which the other end of the central shaft of the planetary gear is inserted and coupled; and
    a connection portion for connecting the first supporting portion with the second supporting portion and supporting the first and second supporting portions.

4. The electric power steering apparatus as claimed in claim 3, further comprising: a first bearing mounted on an outer peripheral surface of one end of the central shaft of the planetary gear, and a second bearing mounted on an outer peripheral surface of the other end of the central shaft of the planetary gear.

5. The electric power steering apparatus as claimed in any one of claim 1, wherein the first ring gear has a different number of gear teeth from those of the second ring gear, and one of the first and second ring gears has a positive electric potential while the other has a negative electric potential.

* * * * *